(12) United States Patent
Cheung et al.

(10) Patent No.: US 11,038,683 B1
(45) Date of Patent: Jun. 15, 2021

(54) SECURE DATA PROCESSING

(71) Applicant: Via Science, Inc., Somerville, MA (US)

(72) Inventors: Kai Chung Cheung, Markham, CA (US); Jeremy Taylor, Quebec (CA); Mathew Rogers, Montreal (CA); Colin Gounden, Cambridge, MA (US)

(73) Assignee: Via Science, Inc., Somerville, MA (US)

( * ) Notice: Subject to any disclaimer, the term of this patent is extended or adjusted under 35 U.S.C. 154(b) by 0 days.

(21) Appl. No.: 17/156,009

(22) Filed: Jan. 22, 2021

Related U.S. Application Data

(60) Provisional application No. 62/965,429, filed on Jan. 24, 2020, provisional application No. 62/969,377, filed on Feb. 3, 2020.

(51) Int. Cl.
*H04L 9/30* (2006.01)
*H04L 29/06* (2006.01)

(52) U.S. Cl.
CPC ............ *H04L 9/30* (2013.01); *H04L 63/0442* (2013.01); *H04L 2209/46* (2013.01)

(58) Field of Classification Search
CPC .... H04L 9/30; H04L 63/0442; H04L 2209/46
See application file for complete search history.

(56) References Cited

U.S. PATENT DOCUMENTS

| | | | | |
|---|---|---|---|---|
| 10,541,805 B2* | 1/2020 | Laine | ...................... | H04L 9/008 |
| 10,972,261 B1* | 4/2021 | Rogers | .................... | H04L 9/008 |
| 2007/0116283 A1* | 5/2007 | Tuyls | ................... | H04L 9/0844 |
| | | | | 380/255 |
| 2008/0304657 A1* | 12/2008 | Tuyls | ...................... | G06F 7/588 |
| | | | | 380/28 |
| 2010/0329448 A1* | 12/2010 | Rane | ........................ | H04L 9/008 |
| | | | | 380/28 |
| 2011/0110525 A1* | 5/2011 | Gentry | ...................... | H04L 9/14 |
| | | | | 380/285 |
| 2015/0089243 A1* | 3/2015 | Veugen | ................... | H04L 9/008 |
| | | | | 713/190 |
| 2015/0170197 A1* | 6/2015 | Smith | ..................... | H04L 9/008 |
| | | | | 705/14.41 |
| 2016/0119119 A1* | 4/2016 | Calapodescu | ....... | G06F 21/6227 |
| | | | | 380/30 |

(Continued)

FOREIGN PATENT DOCUMENTS

KR            101784613 B1      10/2017

OTHER PUBLICATIONS

Caragata, International Search Report and Written Opinion issued in International Patent Application No. PCT/US2021/014685, dated Apr. 16, 2021, 11 pages.

(Continued)

*Primary Examiner* — Aravind K Moorthy
(74) *Attorney, Agent, or Firm* — Pierce Atwood LLP

(57) ABSTRACT

A first component determines encrypted data representing an event and encrypted threshold data corresponding to an outlier of the event. The first system may process the data using, for example, one or more composite integers, and may send the result to a second system. This second system may subtract the data to determine of the encrypted data is greater than, less than, or equal to the encrypted threshold. If so, the second system may determine that the encrypted data corresponds to an outlier of the data. The second system may send an indication of this determination to a third system.

20 Claims, 11 Drawing Sheets

(56) References Cited

U.S. PATENT DOCUMENTS

| | | | | |
|---|---|---|---|---|
| 2016/0335440 | A1* | 11/2016 | Clark | H04L 9/085 |
| 2017/0155628 | A1* | 6/2017 | Rohloff | H04L 63/0478 |
| 2018/0276417 | A1* | 9/2018 | Cerezo Sanchez | G06F 21/74 |
| 2018/0373882 | A1* | 12/2018 | Veugen | G06F 21/602 |
| 2019/0130119 | A1* | 5/2019 | Lin | G06F 3/067 |
| 2019/0155956 | A1* | 5/2019 | Kesarwani | H04L 9/14 |
| 2019/0205568 | A1* | 7/2019 | Veugen | G06F 7/723 |
| 2019/0294805 | A1* | 9/2019 | Taylor | G06N 20/10 |
| 2019/0318346 | A1* | 10/2019 | Ben-David | H04L 9/14 |
| 2020/0082113 | A1* | 3/2020 | Van Liesdonk | G06F 21/6227 |
| 2020/0186352 | A1* | 6/2020 | Arora | G06K 9/00885 |
| 2020/0228341 | A1* | 7/2020 | Mohassel | H04L 9/0869 |
| 2020/0244435 | A1* | 7/2020 | Shpurov | H04L 9/3218 |
| 2020/0259646 | A1* | 8/2020 | Kwak | H04L 9/3239 |
| 2020/0279045 | A1* | 9/2020 | Tueno | H04L 9/30 |
| 2020/0358599 | A1* | 11/2020 | Baracaldo Angel | H04L 9/008 |
| 2020/0382273 | A1* | 12/2020 | Vald | H04L 63/166 |
| 2020/0382953 | A1* | 12/2020 | Li | H04L 69/24 |
| 2021/0034455 | A1* | 2/2021 | Deng | H04L 9/0637 |
| 2021/0067345 | A1* | 3/2021 | Shamai | H04L 9/3252 |

OTHER PUBLICATIONS

Kumarage, et al., "Distributed anomaly detection for industrial wireless sensor networks based on fuzzy data modelling," Journal of Parallel and Distributed Computing, Elsevier, Mar. 4, 2013, pp. 790-806.

* cited by examiner

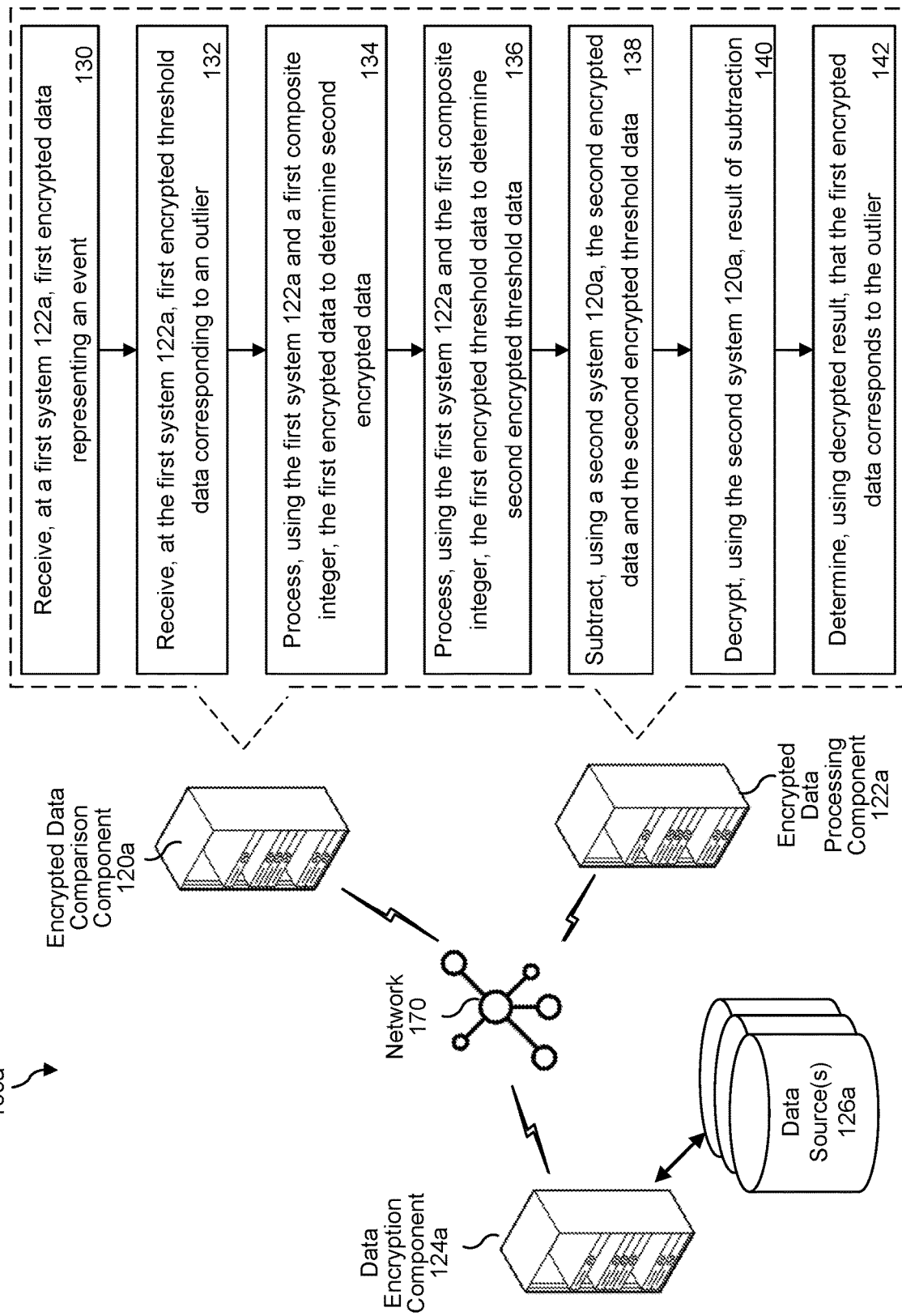

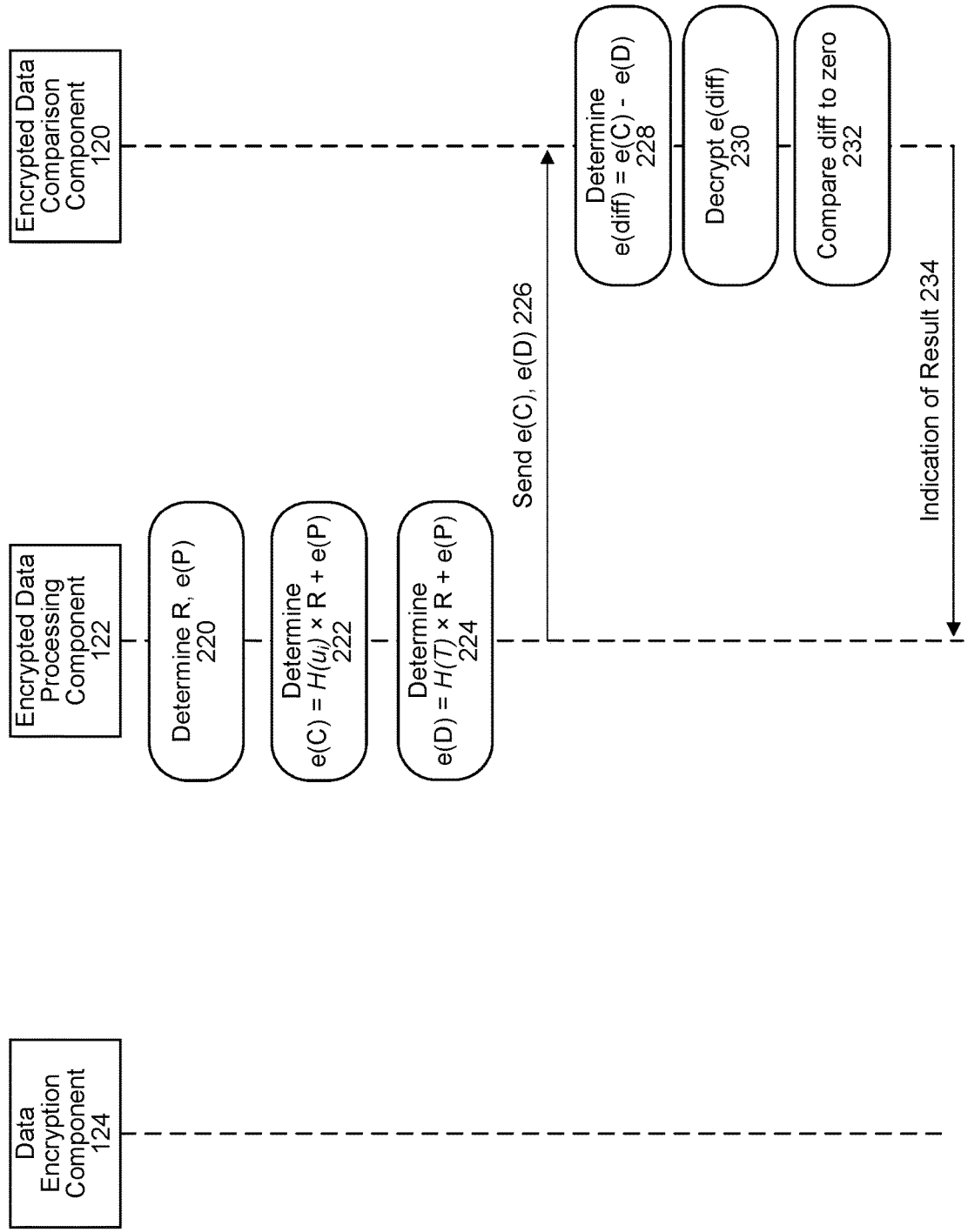

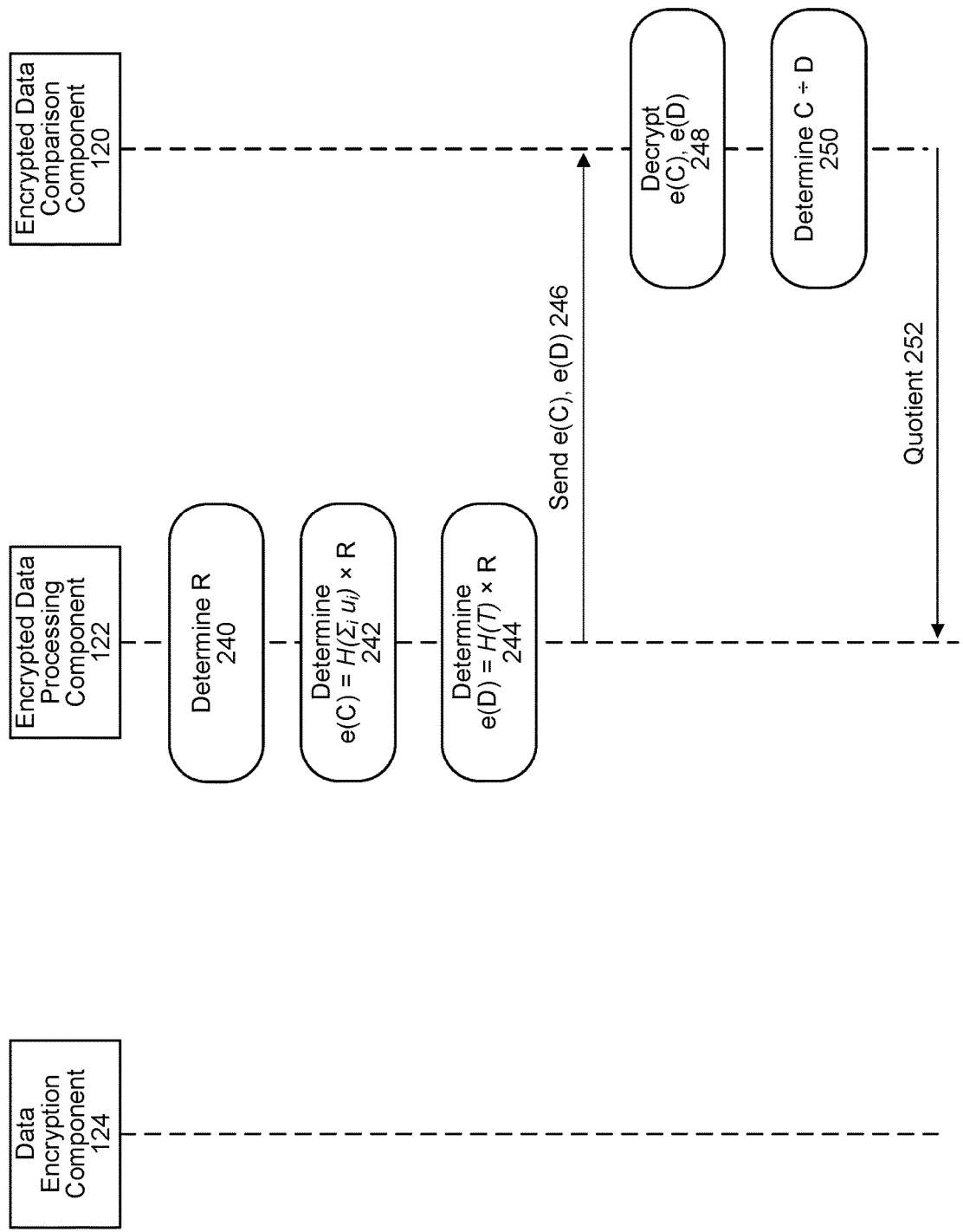

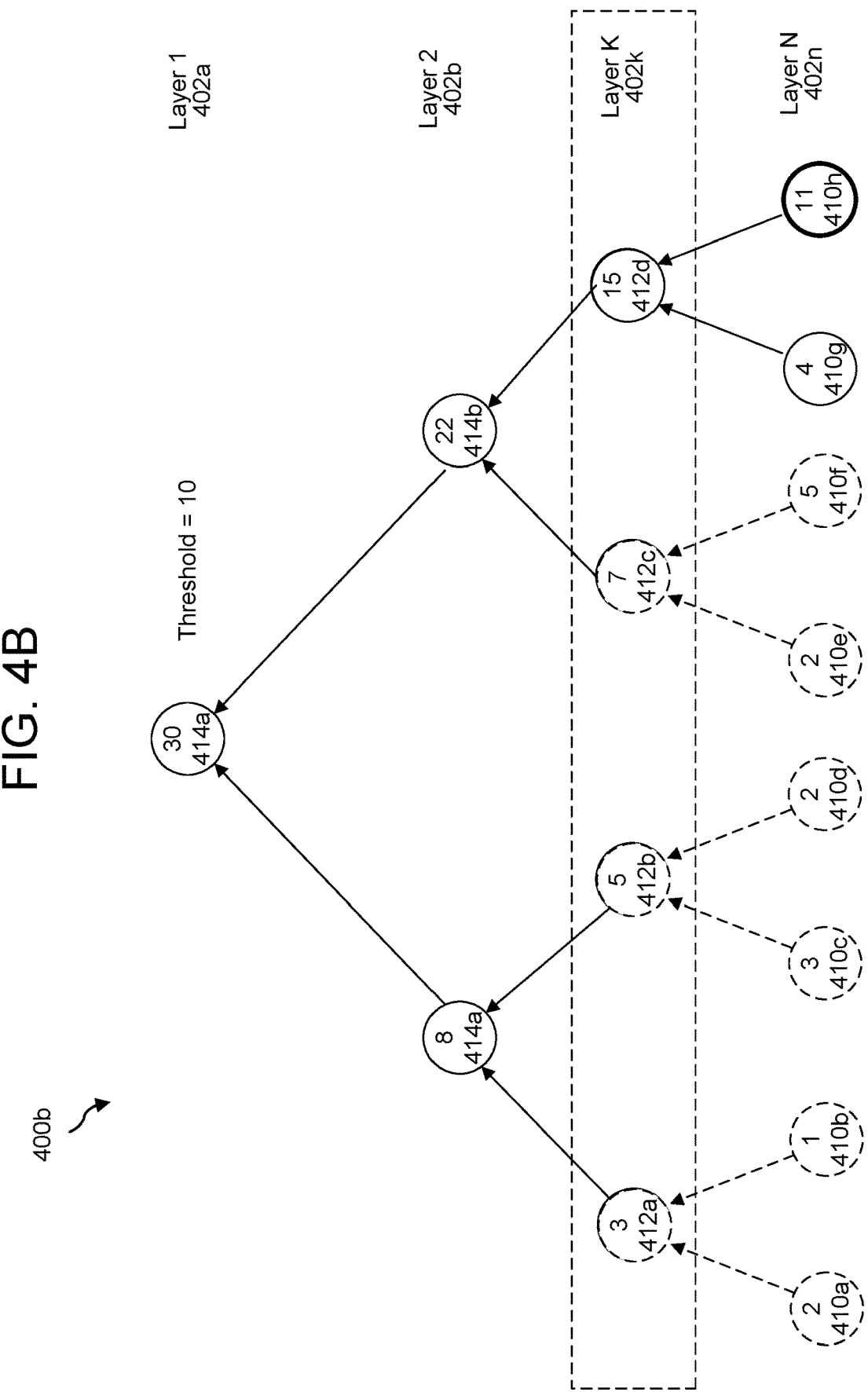

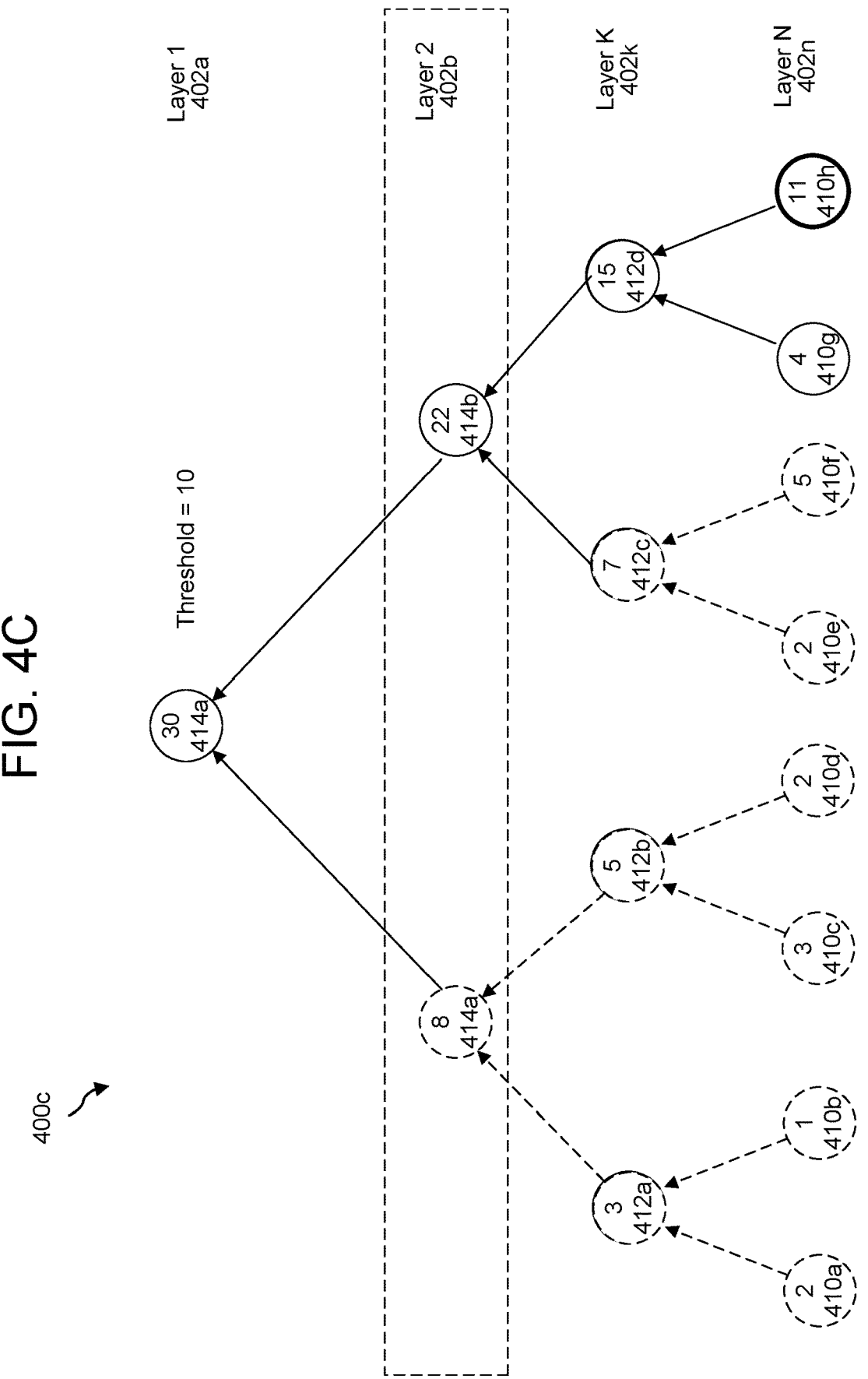

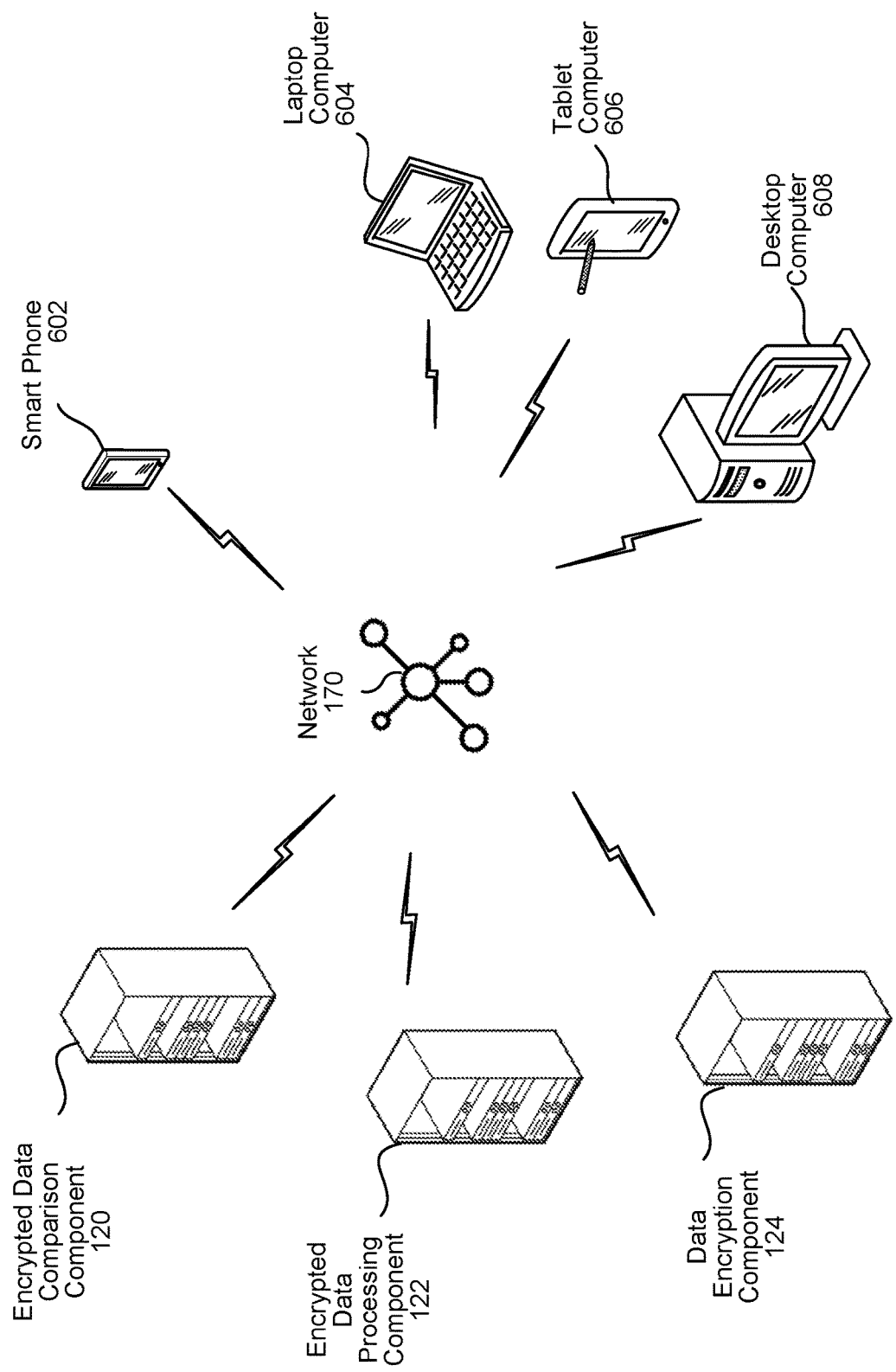

US 11,038,683 B1

SECURE DATA PROCESSING

CROSS-REFERENCE TO RELATED APPLICATION DATA

This application claims the benefit of and priority to U.S. Provisional Patent Application No. 62/965,429, filed Jan. 24, 2020, and entitled "Efficient Implementation of Secure 15/15 Anonymization Protocol," in the name of Kai Chung Cheung; and U.S. Provisional Patent Application No. 62/969,377, filed Feb. 3, 2020, and entitled "Efficient Implementation of Secure Anonymized Outlier Protocol," in the names of Kai Chung Cheung et al. The above provisional applications are herein incorporated by reference in their entirety.

BACKGROUND

Data security and encryption is a branch of computer science that relates to protecting information from disclosure to other systems and allowing only an intended system access to that information. The data may be encrypted using various techniques, such as public/private key cryptography and/or elliptic cryptography, and may be decrypted by the intended recipient using a shared public key and a private key and/or other corresponding decryption technique. Transmission of the data is protected from being decrypted by other systems at least by their lack of possession of the encryption information.

BRIEF DESCRIPTION OF DRAWINGS

For a more complete understanding of the present disclosure, reference is now made to the following description taken in conjunction with the accompanying drawings.

FIGS. 1A and 1B illustrate systems configured to securely process data according to embodiments of the present disclosure.

FIGS. 2A, 2B, and 2C illustrate processes for securely processing data according to embodiments of the present disclosure.

FIGS. 3, 4A, 4B, and 4C illustrate binary data trees configured to represent data according to embodiments of the present disclosure.

FIG. 6 illustrates a network according to embodiments of the present disclosure.

SUMMARY

Figure 1B:
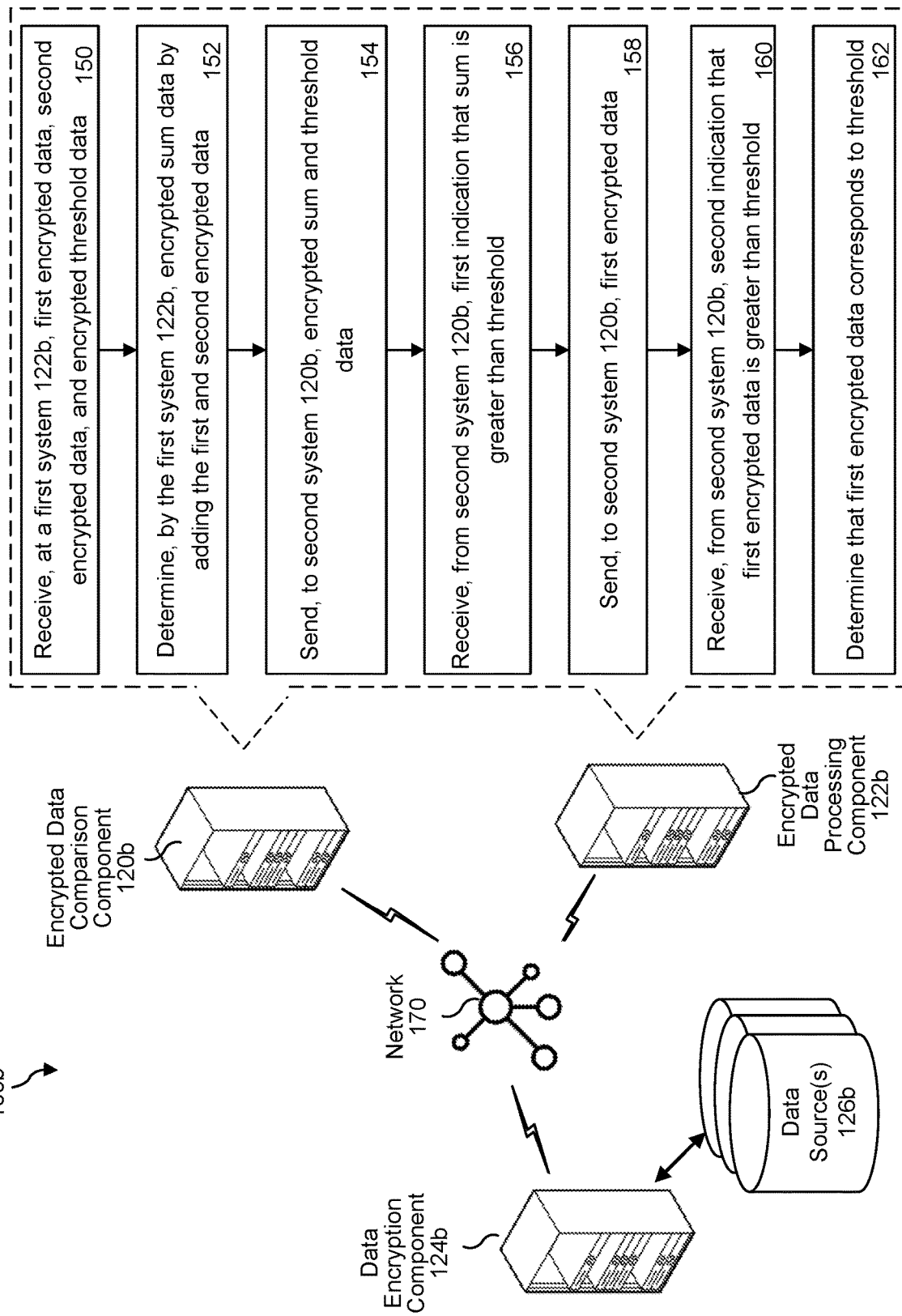

In various embodiments of the present disclosure, a first component (such as an encrypted-data processing component) determines encrypted data representing an event and encrypted threshold data corresponding to an outlier of the event. The first system may process the data using, for example, one or more composite integers, and may send the result to a second system (such as an encrypted-data comparison component). This second system may subtract the data to determine of the encrypted data is greater than, less than, or equal to the encrypted threshold. If so, the second system may determine that the encrypted data corresponds to an outlier of the data. The second system may send an indication of this determination to a third system (which may be a data-encryption component, and which may be the source of the encrypted data).

DETAILED DESCRIPTION

Data-processing systems may be used to process sets of data to determine if any of the non-negative values of the data in a set exceed a threshold, non-negative value; these values may be referred to as "outliers." An electric company may, for example, use such a data-processing system to determine if a value corresponding to a set of electricity-consumption data exceeds a threshold value for consumers of electricity in a city or area to thereby determine if there is an entity consuming an unusually large amount of electricity.

If the owners of the sets of data trust the data-processing systems to learn the values of the data (and any other personal information associated with the data), this comparison may be done by simply performing a series of comparison operations. In many applications, however, such as the electricity usage example described above, providing that information to the data-processing system may not be permitted by the data owner and/or may be prohibited by law or statute.

Embodiments of the present disclosure thus relate to systems and methods for securely processing data, such as data representing an event to determine if one or more values of the data correspond to outlier values. The event may be any real-world occurrence, such as usage of electricity, and the data may represent a value corresponding to that event. The techniques described herein may allow such processing while preventing components performing the processing, such as encrypted-data comparison component(s) and/or encrypted-data processing component(s), from having access or otherwise discovering data associated with other component(s), such a data-encryption component. The techniques described herein may instead or in addition allow for faster processing of data, such as the techniques related to reducing a number of comparisons by pruning data trees.

In some embodiments, the data-encryption component, encrypted-data comparison component, and/or encrypted-data processing component encrypt and/or de-crypt data in accordance with an encryption technique, such as Rivest-Shamir-Adleman (RSA) encryption, elliptic-curve encryption, or any encryption that is homomorphic (partially or fully); in these embodiments, the data-encryption component may transmit, to the other components, only encrypted data.

FIG. 1A illustrates a system 100a that includes an encrypted-data comparison component 120a, a data-encryption component 124a, one or more data source(s) 126a, an encrypted-data processing component 122a, and a network 170. The network 170 may include the Internet and/or any other wide- or local-area network, and may include wired, wireless, and/or cellular network hardware. The encrypted-data comparison component 120a may communicate, via the network 170, with one or more data-encryption components 124a and/or one or more encrypted-data processing components 122a. The data-encryption component 124a may transmit, via the network 170, data to and/or from the other systems using one or more application programming interfaces (APIs). Each API may correspond to a particular application. A particular application may, for example, be operated within the data-encryption component 124a or may be operating using one or more of the other systems.

In accordance with the present disclosure, a first component (e.g., the encrypted-data processing component 122a) receives (130) first encrypted data representing an event, the first data encrypted using public-key data. As explained in greater detail below, the public-key data may have been previously determined and received from a second system, such as the encrypted-data comparison component 120a, which may have also determined corresponding private-key data. The first encrypted data includes at least one of a set of values, such as 15 values. The first encrypted data may have been determined and received from a third system, such as the data-encryption component 124a, which may have further received the public-key data from the second system.

The first component 122a may further receive (132) first encrypted threshold data representing a threshold corresponding to an outlier of the event, the first encrypted threshold data encrypted using the public-key data. As explained in greater detail below, the first encrypted threshold data may be received from an algorithm-provider system and/or may be determined using a sum of the set of values. In some embodiments, the encrypted threshold data corresponds to 0.15× the sum.

The first component 122a may process (134) the first encrypted data using at least a first composite random integer to determine second encrypted data and may process (136) the first encrypted threshold data using at least the first composite integer to determine second encrypted threshold data. This processing may include determining a first composite random integer R and a second composite random integer P, multiplying the encrypted data by R, and then adding an encrypted version of P to the result. A composite integer may refer to an integer that is the result of multiplying at least two other integers.

The first component 122a may send the second encrypted data and the second encrypted threshold data to the second component 120a. The second component 120a may subtract (138) the second encrypted data from the second encrypted threshold data to determine encrypted difference data and may decrypt (140), using private-key data corresponding to the public-key data, the encrypted difference data to determine difference data. The first, second, and/or third components may then determine (142), using the difference data, that the first encrypted data corresponds to the outlier.

Figure 3:
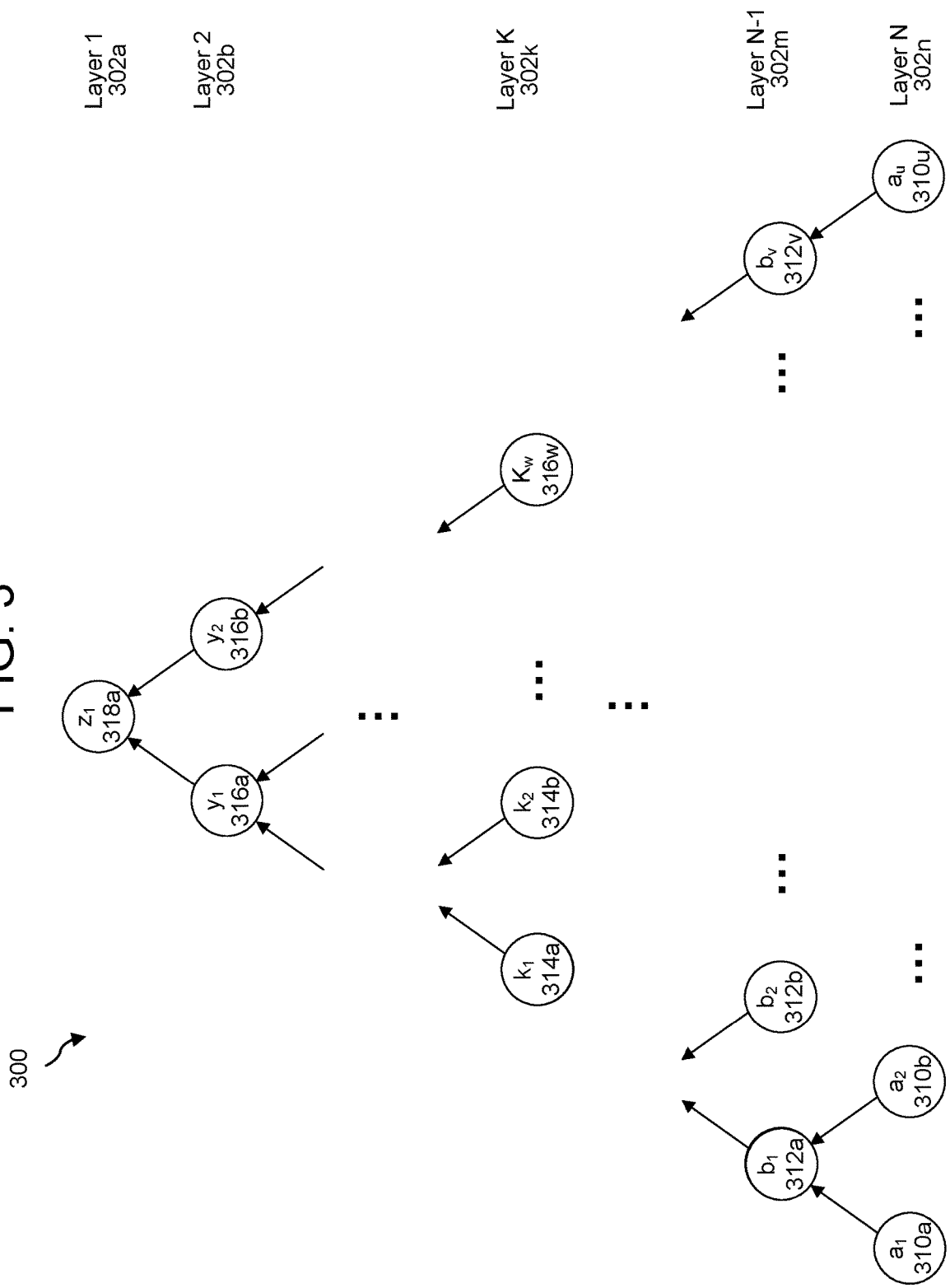

Referring to FIG. 1B, in various embodiments and with reference also to FIG. 3, a system 100b including the encrypted-data processing component 122b and the encrypted-data comparison component 120b may perform at least some pruning using one or more sums of the encrypted data received from the data-encryption component 124b before sending the actual encrypted data to the encrypted data comparison component 120b. Pruning techniques are described in greater detail herein, but if a value based at least in part on a sum of at least two items of encrypted data is less than the encrypted threshold, the encrypted-data processing component 122b need not send the two items of encrypted data to the encrypted-data comparison component 120b (e.g., they may be "pruned"). The encrypted-data processing component 122b may send items of encrypted data only if a value based at least in part on their sum is greater than the encrypted threshold.

Thus, the first system 122b may receive (150) first and second items of encrypted data corresponding to an event as well as encrypted threshold data representing a threshold corresponding to an outlier of the event. The first system 122b may determine (152) encrypted sum data based at least in part on adding the first and second encrypted data (e.g., the first system 122b may construct at least a portion of the binary tree 300 illustrated in FIG. 3). The first system 122b may send (154), to the second system 120b, first data correspond got the encrypted sum data and second data corresponding to the encrypted threshold data. The second system 120b may perform some or all of the associated steps shown in, for example, FIG. 2B. The first system 122b may receive (156) a first indication that the encrypted sum data is greater than the encrypted threshold data (e.g., the sum is greater than the threshold). Thus, when the first system 122b determines that this portion of the tree cannot be pruned, the first system 122b may send (158), to the second system 120b, the first encrypted data (for comparison to the already-send encrypted threshold data). The first system 122b may then receive (160), from the second system that the first encrypted data is greater than the threshold. The first system 122b and/or second system 120b may then determine (162) that the first encrypted data corresponds to the outlier.

Figure 2A:
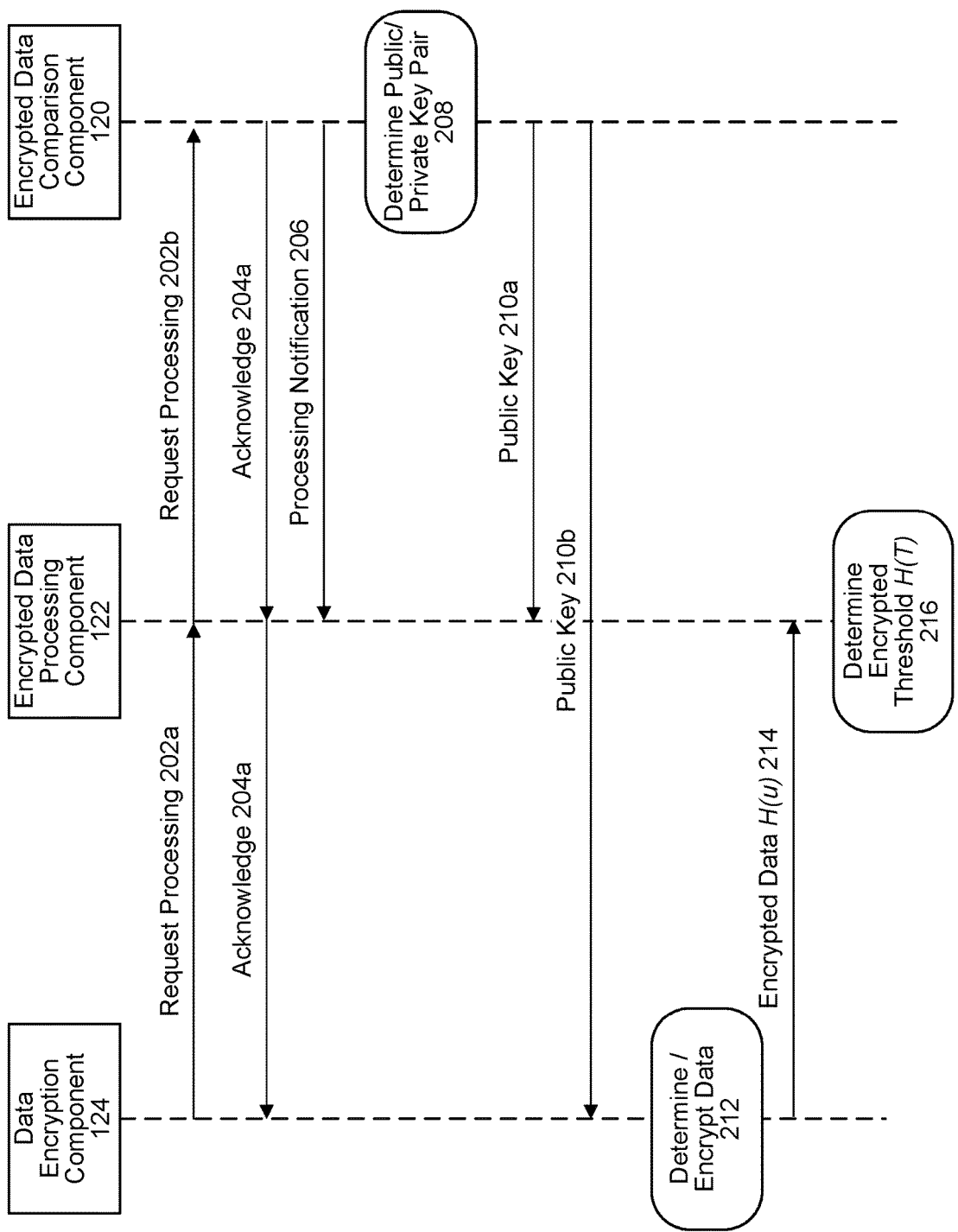

FIGS. 2A, 2B, and 2C illustrate processes for securely processing data according to embodiments of the present disclosure. Referring first to FIG. 2A, the data-encryption component 124 may send, to the encrypted-data processing component 122 and/or encrypted-data comparison component 120, a request (202a and/or 202b) to enable determination of one or more outliers using one or more items of encrypted input data. This request may include an indication include a desired time that the outlying data should remain above the outlier threshold, such as one day, two days, one week, or other such duration of time.

In some embodiments, the encrypted-data processing component 122 and/or encrypted-data comparison component 120 may, upon receipt of the request 202a/202b, send a corresponding acknowledgement (204a/204b) indicating acceptance of the request. The acknowledgement may indicate that the encrypted-data processing component 122 and/or encrypted-data comparison component 120 is capable of determining existence of the outlier (within, in some embodiments, the desired duration of time). In some embodiments, however, the encrypted-data processing component 122 and/or encrypted-data comparison component 120 may send, to the data-encryption component 124, response data. This response data may include a request for further information, such as the length of time that the data should be processed. The data-encryption component 124 may then send, in response to the request, the additional information, and the encrypted-data processing component 122 and/or encrypted-data comparison component 120 may then send the acknowledgement 204a/204b in response.

The encrypted-data comparison component 120 may determine (208) a public/private key pair and may send the public key 210a/210b to the encrypted-data processing component 122 and to the data-encryption component 124. Although FIG. 2A illustrates determination and distribution of a single key pair, the encrypted-data comparison component 120 determine a new public/private key pair for each outlier determination (as described herein), for groups of outlier determinations, and/or for different items of data in a single outlier determination. The present disclosure is not limited to any particular frequency of determination of the public/private key pair.

The data-encryption component may determine and encrypt data (212) using at least the public key 210b, as described in greater detail below. The data-encryption component may then send at least one item of encrypted data 214 to the encrypted-data processing component 122, which may process the encrypted data as described below with reference to FIGS. 2B and 2C. The encrypted-data processing component 122 may further determine (216) encrypted threshold data. In some embodiments, the encrypted threshold data corresponds to a fraction, such as 15%, of the sum of two or more items of encrypted data 214. In some embodiments, the encrypted-data processing component 122 may verify that the number of items is at least a positive constant. In some embodiments, the constant is fifteen. In other embodiments, the encrypted-data processing component 122 receives the encrypted threshold data from another system or component, such as an algorithm-provider system. The algorithm-provider system may send this encrypted threshold data in response to a request from the data-encryption component 124 and/or other system associated with one or more data sources 126. The algorithm-provider system threshold may be an absolute number or may be a percentage of the sum (e.g., a result of multiplying the sum by a number between 0.0 and 1.0) of the items of encrypted data.

The data-encryption component 124 may encrypt data in accordance with an encryption function H(m). In some embodiments, the encryption function H(m) is defined using the below equation (1), in which m is less than the value of a Carmichael's totient function $\lambda(n)$.

$$H(m) = \alpha^{me} \pmod{n} \tag{1}$$

The encrypted-data comparison component 120 may decrypt data in accordance with a decryption function $H^{-1}(c)$. In some embodiments, the decryption function $H^{-1}(c)$ is defined using the below equation (2), in which $\log_a$ is the discrete logarithm function over base a. The algorithm function $\log_a$ may be computed by using, for example, a "baby-step giant-step" algorithm.

$$H^{-1}(c) = \log_a(c^d) \pmod{n} \tag{2}$$

In various embodiments, data encrypted using the encryption function H(m) is additively homomorphic such that $H(m_1 + m_2)$ may be determined in accordance with the below equations (3) and (4).

$$H(m_1 + m_2) = a^{(m_1 + m_2)e} \pmod{n} \tag{3}$$

$$H(m_1 + m_2) = a^{m_1 e} a^{m_2 e} \pmod{n} \tag{3}$$

In some embodiments, the above equations (3) and (4) may be computed or approximated by multiplying $H(m_1)$ and $H(m_2)$ in accordance with the below equation (5).

$$H(m_1 + m_2) = H(m_1) H(m_2) \tag{5}$$

The encrypted-data processing component 122 may thus, given two items of encrypted data $H(m_1)$ and $H(m_2)$, determine $H(m_1 + m_2)$ without first applying the decryption function $H^{-1}(c)$. In some embodiments, the value of m is 32 bits in size.

In some embodiments, the encrypted-data processing component 122, encrypted-data comparison component 120, and/or data-encryption component 124 may use elliptic-curve cryptography to securely process, send, and/or receive data. Elliptic-curve cryptography utilizes an elliptic curve to encrypt data, as opposed to multiplying two prime numbers to create a modulus, as described above. An elliptic curve E is a plane curve over a finite field $F_p$ of prime numbers that satisfies the below equation (6).

$$y^2 = x^3 + ax + b \tag{6}$$

The finite field $F_p$ of prime numbers may be, for example, the NIST P-521 field defined by the U.S. National Institute of Standards and Technology (NIST). In some embodiments, elliptic curves over binary fields, such as NIST curve B-571, may be used as the finite field $F_p$ of prime numbers. A key is represented as (x,y) coordinates of a point on the curve; an operator may be defined such that using the operator on two (x,y) coordinates on the curve yields a third (x,y) coordinate also on the curve. Thus, key transfer may be performed by transmitting only one coordinate and identifying information of the second coordinate.

The above elliptic curve may have a generator point, G, that is a point on the curve—e.g., $G = (x,y) \in E$. A number n of points on the curve may have the same order as G—e.g., n = o(G). The identity element of the curve E may be infinity. A cofactor h of the curve E may be defined by the following equation (7).

$$h = \frac{|E(F_p)|}{o(G)} \tag{7}$$

A system, such as the encrypted-data comparison component 120, may select a private key $n_B$ that is less than o(G). In various embodiments, the encrypted-data processing component 122 is not the first system and thus does not know the private key $n_B$. This system may generate a public key $P_B$ in accordance with equation (8).

$$P_B = n_B G = \Sigma_i^{n_B} G \tag{8}$$

This system may then transmit the public key $P_B$ to another system, such as a data-encryption component 124. The system may similarly transmit encryption key data corresponding to domain parameters (p, a, b, G, n, h). The data-encryption component 124 may then encrypt data m using the public key $P_B$. The data-encryption component 124 may first encode the data m; if m is greater than zero, the data-encryption component 124 may encode it in accordance with mG; m is less than zero, the data-encryption component 124 may encode it in accordance with $(-m)G^{-1}$. If G=(x,y), $G^{-1} = (x,-y)$. In the below equations, however, the encoded data is represented as mG for clarity. The data-encryption component 124 may perform the encoding using, for example, a doubling-and-adding method, in O(log(m)) time.

To encrypt the encoded data mG, the data-encryption component 124 may select a random number c, wherein c is greater than zero and less than a finite field prime number p. The data-encryption component 124 may thereafter determine and send encrypted data in accordance with the below equation (9).

$$\{cG, mG + cP_B\} \tag{9}$$

The encrypted-data comparison component 120 may receive the encrypted data from the data-encryption component 124 and may first determine a product of the random number c and the public key $P_B$ in accordance with equation (10).

$$cP_B = c(n_B G) = n_B(cG) \tag{10}$$

The encrypted-data comparison component 120 may then determine a product of the data m and the generator point G in accordance with the below equation (11).

$$mG = (mG + cP_B) - n_B(cG) \tag{11}$$

Finally, the encrypted-data comparison component 120 may decode mG to determine the data m. This decoding, which may be referred to as solving the elliptic curve discrete logarithm, may be performed using, for example, a baby-step-giant-step algorithm in $O(\sqrt{m})$ time.

In some embodiments, the encrypted-data processing component 122 may further determine that a number of items u in in the encrypted data H(u) equals a predetermined number (e.g., 15).

Referring to FIG. 2B, the encrypted-data processing component 122 and the encrypted-data comparison component 120 may together process the encrypted data H(u) and the encrypted threshold data H(T) to determine whether each item of encrypted data $H(u_i)$ is greater than, equal to, or less than the encrypted threshold data H(T). As mentioned above, the encrypted threshold data H(T) may represent a threshold above which items of encrypted data H($u_i$) are considered to be outliers. If any such items encrypted data H($u_i$) are determined, the encrypted-data comparison component 120 may send an indication thereof to the data-encryption component 124 and/or other system associated with a data source 126.

In various embodiments, the encrypted-data processing component 122 may determine (220) composite integers R and P. The values of R and P may be determined by multiplying at least two other integers (hence they are "composites" of other integers), which may be prime numbers. The encrypted-data processing component 122 may determine an encrypted value e(P) of P using the private key.

The encrypted-data processing component 122 may receive first encrypted data H($u_i$) from the data-encryption component 124 and may determine (as described above) first encrypted threshold data H(T). The encrypted-data processing component 122 may further determine (222) second encrypted data e(C) by multiplying the first encrypted data H($u_i$) by R and adding e(P) to the result and may determine (224) second encrypted threshold data e(D) by multiplying the first encrypted threshold data H(T) by R and adding e(P) to the result. In other words, e(C) and e(D) are obfuscated versions of H($u_i$) and H(T), but each differ from the original values of H($u_i$) and H(T) in the same manner. The encrypted-data processing component 122 may then send (226) the second encrypted data e(C) and the second encrypted threshold data e(D) to the encrypted-data comparison component 120.

The encrypted-data comparison component 120 may then determine (228) an encrypted difference e(diff) between the second encrypted data e(C) and the second encrypted threshold data e(D) by subtracting one value from the other. The encrypted-data comparison component 120 may then decrypt (230) the encrypted difference e(diff) using the private key to determine difference data diff and may compare (232) the difference data diff to zero.

If the sign of the difference data diff is positive (and if the encrypted-data comparison component 120 subtracted the second encrypted data e(C) from the second encrypted threshold data e(D)), the encrypted-data comparison component 120 may then determine that the first encrypted data H($u_i$) is less than the first encrypted threshold data H(T) (and thus that the unencrypted data $u_i$ is less than the threshold T and is not an outlier). If the sign of the difference data diff is negative (and if the encrypted-data comparison component 120 subtracted the second encrypted data e(C) from the second encrypted threshold data e(D)), the encrypted-data comparison component 120 may then determine that the first encrypted data H($u_i$) is greater than the first encrypted threshold data H(T) (and thus that the unencrypted data $u_i$ is greater than the threshold T and is an outlier). If the encrypted-data comparison component 120 reversed the order of the operands, the sign of the difference data diff will have the opposite meanings. The encrypted-data comparison component 120 may thereafter send, to the encrypted-data processing component 122 an indication 234 of the result. The indication may thus indicate whether the first encrypted data H($u_i$) is less than, equal to, or greater than the first encrypted threshold data H(T).

Although FIG. 2B illustrates a single comparison, the encrypted-data processing component 122 and/or the encrypted-data comparison component 120 may perform any number of comparisons. In some embodiments, the encrypted-data processing component 122 and/or the encrypted-data comparison component 120 perform a certain number of comparisons (e.g., 15) before sending an indication of the result to the data-encryption component 124 and/or system associated with a data source 126. The encrypted-data comparison component 120 may send an indication if an outlier is found or not, or may send an indication only if an outlier is found.

In some embodiments, the encrypted-data processing component 122 and/or the encrypted-data comparison component 120 perform a number of comparisons over a first period of time (e.g., an hour, a day, a week, or some other period of time). The encrypted-data comparison component 120 may send the indication if an outlier is found for a second period of time (e.g., an hour, a day, a week, or some other period of time). Similarly, the encrypted-data processing component 122 may send the second encrypted threshold data e(D) for each comparison or only once for a number (e.g., 15) comparisons.

Referring to FIG. 2C, the encrypted-data processing component 122 and/or the encrypted-data comparison component 120 may perform a number of operations to determine a result of a division. As explained in greater detail below with reference to FIGS. 3, 4A, and 4B, this division may be used to find a value k for use with pruning a binary tree of values.

In various embodiments, the encrypted-data processing component 122 determines (240) a composite integer R as described above. The encrypted-data processing component 122 may then determine (242) second encrypted data e(C) by determining the sum of H($\Sigma_i u_i$) of a number u of items of first encrypted data times R and may determine (244) second encrypted threshold data e(D) by multiplying first encrypted threshold data H(T) by R. The encrypted-data processing component 122 may send (246) the second encrypted data e(C) and the second encrypted threshold data e(D) to the encrypted-data comparison component 120.

The encrypted-data comparison component 120 may then decrypt (248) the second encrypted data e(C) and the second encrypted threshold data e(D) to determine data C and data D, and may divide (250) D into C to determine the quotient. As described below, this quotient may be a level k in a binary tree. The encrypted-data comparison component 120 may then send the quotient (252) to the encrypted-data processing component 122.

The above-described method of computing the quotient allows the encrypted-data comparison component 120 to learn the value of k. In some embodiments, a system associated with a data source 126 (and/or other system) may wish to prevent the encrypted-data comparison component 120 from learning the value of k. In these embodiments, the encrypted-data processing component 122 may cause the creation of four different encrypted-data comparison components 120a, 120b, 120c, 120d, may send modified versions of the sum of H($\Sigma_i u_i$) and of H(T) to each, and may combine the results received back from each of the four different encrypted-data comparison components 120a, 120b, 120c, 120d. Thus, in these embodiments, none of the four different encrypted-data comparison components 120a, 120b, 120c, 120d learn the value of k.

More specifically, the encrypted-data processing component 122 determines two non-zero composite integers R and P (as described above) such that H(P)+H(T)≠0. The encrypted-data processing component 122 then creates first and second values for each of the four encrypted-data comparison components 120a, 120b, 120c, 120d, as shown below in Table 1.

TABLE 1

| First Value | Second Value | Recipient |
|---|---|---|
| $H(\Sigma_i u_i) + H(R)$ | $H(T) + H(P)$ | First EDC component 120a |
| $P \times (H(\Sigma_i u_i) + H(R))$ | $(H(T) \times H(T)) + (P \times H(T))$ | Second EDC component 120b |
| $-H(R)$ | $H(T) + H(P)$ | Third EDC component 120c |
| $H(-R \times P)$ | $(H(T) \times H(T)) + (P \times H(T))$ | Fourth EDC component 120d |

Each of the four encrypted-data comparison components 120a, 120b, 120c, 120d, upon receipt of the first and second values, decrypts them, divides the first value by the second value, and returns the result to the encrypted-data processing component 122. The encrypted-data processing component 122 may then sum the returned results to determine the value of k.

In some embodiments, to perform the multiplications described above in Table 1, the encrypted-data processing component 122 may employ a similar process as described above, as shown below in Table 2. In this multiplication process, the encrypted-data processing component 122 determines two random numbers $r_1$ and $r_2$ and determines the below first and second values for each recipient encrypted-data comparison component 120a, 120b, 120c, 120d for first and second multiplicative operands $f_1$ and $f_2$. The encrypted-data comparison component 120a, 120b, 120c, 120d multiply each value and return the result to the encrypted-data processing component 122, which adds each of the four results to determine the result of multiplying the two operands $f_1$ and $f_2$.

TABLE 2

| First Value | Second Value | Recipient |
|---|---|---|
| $E(f_1) + E(r_1)$ | $E(f_2) + E(r_2)$ | First EDC component 120a |
| $E(f_1) + E(r_1)$ | $-E(r_2)$ | Second EDC component 120b |
| $-E(r_1)$ | $E(f_2) + E(r_2)$ | Third EDC component 120c |
| $E(r_1)$ | $E(r_2)$ | Fourth EDC component 120d |

FIGS. 3, 4A, 4B, and 4C illustrate binary trees configured to represent data according to embodiments of the present disclosure. Referring first to FIG. 3, a largest, bottom layer N 302n of the tree 300 may have u elements 310a . . . 310u; each of the u elements 310a . . . 310u may be an encrypted number and correspond to data $H(u_i)$ received from the data-encryption component 124. The value of u may be any number; in some embodiments, u is greater than or equal to 15.

A next layer N−1 302m of the tree 300 may have u/2 elements (or u/2+1 elements, if u is odd); each element 312a . . . 312v of the next layer N−1 302m may represent the sum of two different elements of the bottom layer N 302n. That is, a first element 312a of the N−1 layer 302m represents the sum of the first two elements 310a, 310b of the bottom layer N 302n, a second element 312b of the N−1 layer 302 represents the sum of the next two elements of the bottom layer N 302n, and so on. If u is odd, a last element 312v of the N−1 layer 302m may represent the value of the last element 310u of the N layer 302n.

A next layer of the tree 300 may similarly represent the pairwise sum of the layer below it, and so on. A next-to-topmost layer 302b of the tree may have two elements 316a, 316b, and a topmost layer 302a of the tree may include a single element 318a. The value of the element 318a of the topmost layer 302a may represent the sum of all the elements in the bottom layer N 302n. In some embodiments, the encrypted-data processing component 122 computes this sum to determine the threshold, as described above; the results of this computation may be used to populate the values of the elements of the tree 300.

In various embodiments, the encrypted-data processing component 122 may prune the tree 300 (that is, remove one or more portion(s) of the tree 300) prior to sending only a non-pruned subset of the values of the elements of the layer N 302n to the encrypted-data comparison component 120 for comparison of each value to the threshold T In various embodiments, operations that may be performed solely on the encrypted-data processing component 122, such as addition of two encrypted values, may be performed relatively quickly, while operations that may be performed by both the encrypted-data processing component 122 and the encrypted-data comparison component 120, such as the comparison function described above with reference to FIG. 2B, may take relatively longer to perform. Therefore, potentially reducing the number of comparisons, even if doing so requires extra additions, may result in an overall reduction of processing time.

The encrypted-data processing component 122 may, for example, determine a value K, as described above, by determining a quotient of the value of the element 318a of the first layer 302a (that is, the sum of all the elements 310 of layer N 302n) divided by the threshold T, as described above with reference to FIG. 2C. For each element 314 in layer K 302k, the encrypted-data processing component 122 and the encrypted-data comparison component 120 may, in accordance with the method of FIG. 2B, determine that the value of the element 314 is less than the threshold T. If so, the encrypted-data processing component 122 may prune the element 314 and all elements below it in the tree 300. That is, because an element 314 in layer k 302k represents the sum of all the elements below it, if the value of that element 316 is below the threshold T, the values of all the elements below it must also be less than the threshold T and need not be also compared to the threshold T.

If the value of an element 314 of layer K 302k is greater than the threshold T, however, the encrypted-data processing component 122 may further cause comparison, again in accordance with the method of FIG. 2B, of any sub-elements below the element 314, excluding elements 310 in the layer N 302n. If, similarly, the value of a sub-element is found to be less than the threshold T, the encrypted-data processing component 122 may prune that sub-element and elements below that sub-element from the tree 300.

After processing all the elements 314 of layer K 302k, as described above, the encrypted-data processing component 122 may then cause comparison of any non-pruned elements 310 of layer N 302n.

Figure 4A:
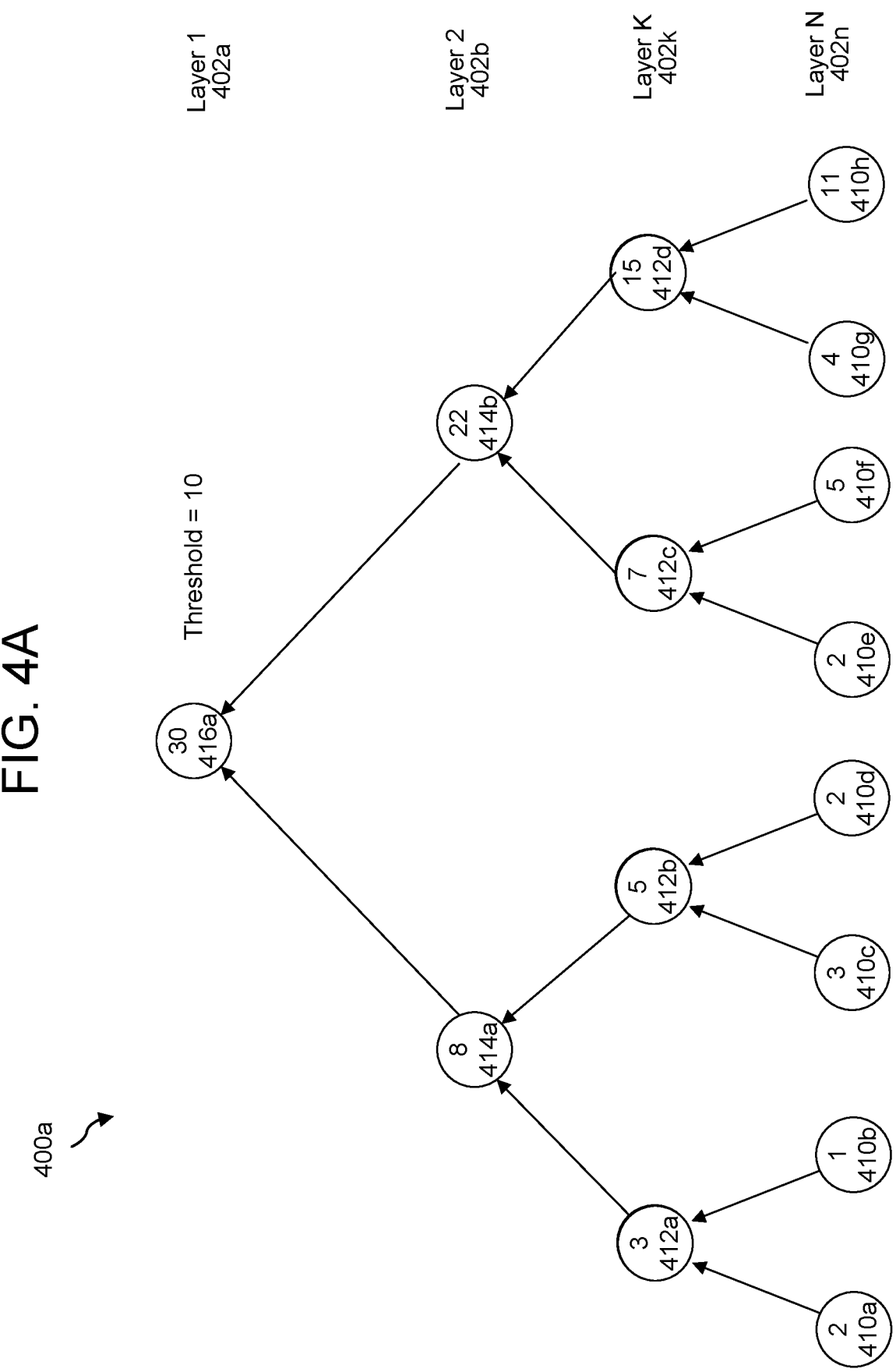

FIGS. 4A, 4B, and 4C illustrate examples of pruning of a tree 400. Referring first to FIG. 4A, a version 402a of the tree includes eight elements in a layer N 402n, their pairwise sums in layer k 402k, and so on, for a final sum of 30 in layer l 402a. In this example, the threshold T is 10, so K=30/10=3, and the layer K 402k is selected as the first layer from layer l 402a to have more than K elements (here, 4 elements). If, in some embodiments, when the threshold T is determined by multiplying the sum by 0.15, K is 6.

Referring to FIG. 4B, the encrypted-data processing component 122 selects the layer K 402k for the pruning analysis and prunes a first element 412a of layer K 402k because it has a first value, 3, less than the threshold 10 (as determined by the method of FIG. 2B); prunes a second element 412b of layer K 402k because it has a second value, 5, less than the threshold 10 (as determined by the method of FIG. 2B);

and prunes a third element 412c of layer K 402k because it has a third value, 7, less than the threshold 10 (as determined by the method of FIG. 2B). A fourth element 412d of layer K 402k has a value, 15, that is greater than the threshold 10, so it is not pruned. The encrypted-data processing component 122 may then determine that an element 410g below the fourth element 412d is less than the threshold an element 410h below the fourth element 412g is greater than the threshold (as determined by the method of FIG. 2B).

Figure 5:
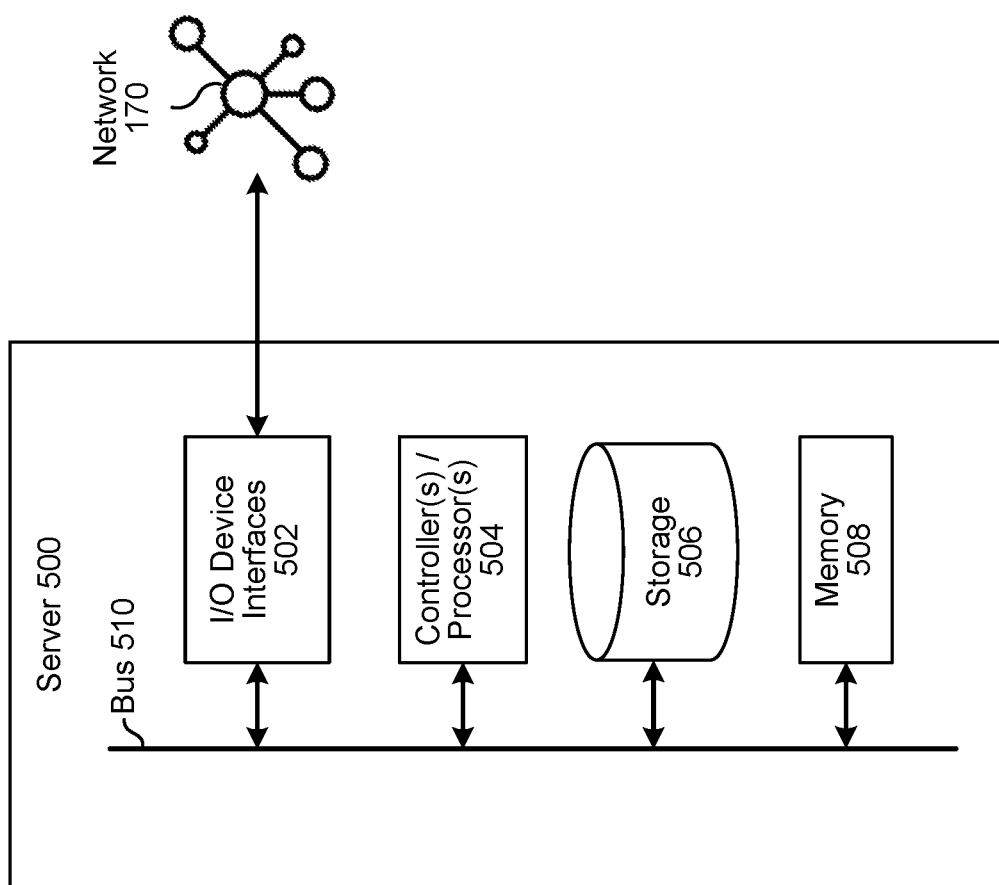
FIG. 5 illustrates components of a system according to embodiments of the present disclosure.

FIG. 5 is a block diagram illustrating a computing environment that includes a server 500; the server 500 may be the encrypted-data comparison component 120, the data-encryption component 124, and/or the encrypted-data processing component 122. The server 500 may include one or more input/output device interfaces 502 and controllers/processors 504. The server 500 may further include storage 506 and a memory 508. A bus 510 may allow the input/output device interfaces 502, controllers/processors 504, storage 506, and memory 508 to communicate with each other; the components may instead or in addition be directly connected to each other or be connected via a different bus.

A variety of components may be connected through the input/output device interfaces 502. For example, the input/output device interfaces 502 may be used to connect to the network 170. Further components include keyboards, mice, displays, touchscreens, microphones, speakers, and any other type of user input/output device. The components may further include USB drives, removable hard drives, or any other type of removable storage.

The controllers/processors 504 may processes data and computer-readable instructions and may include a general-purpose central-processing unit, a specific-purpose processor such as a graphics processor, a digital-signal processor, an application-specific integrated circuit, a microcontroller, or any other type of controller or processor. The memory 508 may include volatile random access memory (RAM), non-volatile read only memory (ROM), non-volatile magnetoresistive (MRAM), and/or other types of memory. The storage 506 may be used for storing data and controller/processor-executable instructions on one or more non-volatile storage types, such as magnetic storage, optical storage, solid-state storage, etc.

Computer instructions for operating the server 500 and its various components may be executed by the controller(s)/processor(s) 504 using the memory 508 as temporary "working" storage at runtime. The computer instructions may be stored in a non-transitory manner in the memory 508, storage 506, and/or an external device(s). Alternatively, some or all of the executable instructions may be embedded in hardware or firmware on the respective device in addition to or instead of software.

FIG. 6 illustrates a number of devices in communication with the encrypted-data comparison component 120, the data-encryption component 124, and/or the encrypted-data processing component 122 using the network 170. The devices may include a smart phone 602, a laptop computer 604, a tablet computer 606, and/or a desktop computer 608. These devices may be used to remotely access the encrypted-data comparison component 120, the data-encryption component 124, and/or the encrypted-data processing component 122 to perform any of the operations described herein.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and data processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, at a first system, first encrypted data representing an event, the first encrypted data encrypted using public-key data;
   receiving, at the first system, second encrypted data representing the event, the second encrypted data encrypted using the public-key data;

receiving, at the first system, encrypted threshold data representing a threshold corresponding to an outlier of the event, the encrypted threshold data encrypted using the public-key data;

determining, by the first system, encrypted sum data based at least in part on adding the first encrypted data and the second encrypted data;

sending, from the first system to a second system, first data corresponding to the encrypted sum data and second data corresponding to the encrypted threshold data;

receiving, at the first system from the second system, a first indication that a first value of the encrypted sum data is greater than a second value of the encrypted threshold data;

based at least in part on receiving the first indication, sending, from the first system to the second system, third data corresponding to the first encrypted data;

receiving, at the first system from the second system, a second indication that a third value of the first encrypted data is greater than the second value; and determining that the first encrypted data corresponds to the outlier.

2. The computer-implemented method of claim 1, further comprising:

subtracting, using the second system, the first data from the second data to determine encrypted difference data; and decrypting, using the second system and private-key data corresponding to the public-key data, the encrypted difference data to determine difference data, wherein the first indication is based at least in part on the difference data.

3. The computer-implemented method of claim 1, further comprising:

receiving, at the first system, third encrypted data representing the event;

receiving, at the first system, fourth encrypted data representing the event; and determining that a sum of the third encrypted data and the fourth encrypted data is less than the threshold.

4. The computer-implemented method of claim 3, further comprising:

determining a second sum based at least in part on the sum and the first encrypted data, wherein the threshold is based at least in part on the second sum.

5. The computer-implemented method of claim 4, further comprising:

multiplying the second sum by a number between 0.0 and 1.0 to determine the threshold.

6. The computer-implemented method of claim 1, further comprising:

receiving, at the first system, third encrypted data representing a number of events; and determining that the number equals a predetermined number.

7. The computer-implemented method of claim 1, wherein determining the third data comprises:

determining a first composite integer;

determining an encrypted second composite integer;

determining a product of the first encrypted data and the first composite integer; and determining a sum of the first encrypted data and the encrypted second composite integer.

8. The computer-implemented method of claim 1, further comprising:

determining, by a third system, data representing the event;

receiving, at the third system, the public-key data;

encrypting, by the third system using the public-key data, the data to determine the first encrypted data; and sending, by the third system to the first system, the first encrypted data.

9. The computer-implemented method of claim 8, further comprising:

determining, by the second system, the public-key data and corresponding private-key data; and sending, by the second system to the third system, the public-key data.

10. The computer-implemented method of claim 9, further comprising:

sending, from the first system to the second system, third encrypted data and fourth encrypted data;

decrypting, by the second system using the private-key data, the third encrypted data to determine fourth data;

decrypting, by the second system using the private-key data, the fourth encrypted data to determine fifth data;

determining, by the second system, a quotient of the fourth data and the fifth data; and sending, from the second system to the first system, the quotient.

11. A system comprising:

at least one processor; and at least one memory including instructions that, when executed by the at least one processor, cause the system to:

receiving, at a first system, first encrypted data representing an event, the first encrypted data encrypted using public-key data;

receiving, at the first system, second encrypted data representing the event, the second encrypted data encrypted using the public-key data;

receiving, at the first system, encrypted threshold data representing a threshold corresponding to an outlier of the event, the encrypted threshold data encrypted using the public-key data;

determining, by the first system, encrypted sum data based at least in part on adding the first encrypted data and the second encrypted data;

sending, from the first system to a second system, first data corresponding to the encrypted sum data and second data corresponding to the encrypted threshold data;

receiving, at the first system from the second system, a first indication that a first value of the encrypted sum data is greater than a second value of the encrypted threshold data;

based at least in part on receiving the first indication, sending, from the first system to the second system, third data corresponding to the first encrypted data;

receiving, at the first system from the second system, a second indication that a third value of the first encrypted data is greater than the second value; and determining that the first encrypted data corresponds to the outlier.

12. The system of claim 11, wherein the at least one memory further includes instructions, that, when executed by the at least one processor, further cause the system to:

subtracting, using the second system, the first data from the second data to determine encrypted difference data; and decrypting, using the second system and private-key data corresponding to the public-key data, the encrypted difference data to determine difference data, wherein the first indication is based at least in part on the difference data.

13. The system of claim 11, wherein the at least one memory further includes instructions, that, when executed by the at least one processor, further cause the system to:
receiving, at the first system, third encrypted data representing the event;
receiving, at the first system, fourth encrypted data representing the event; and
determining that a sum of the third encrypted data and the fourth encrypted data is less than the threshold.

14. The system of claim 13, wherein the at least one memory further includes instructions, that, when executed by the at least one processor, further cause the system to:
determining a second sum based at least in part on the sum and the first encrypted data, wherein the threshold is based at least in part on the second sum.

15. The system of claim 14, wherein the at least one memory further includes instructions, that, when executed by the at least one processor, further cause the system to:
multiplying the second sum by a number between 0.0 and 1.0 to determine the threshold.

16. The system of claim 11, wherein the at least one memory further includes instructions, that, when executed by the at least one processor, further cause the system to:
receiving, at the first system, third encrypted data representing a number of events; and
determining that the number equals a predetermined number.

17. The system of claim 11, wherein the at least one memory further includes instructions, that, when executed by the at least one processor, further cause the system to:
determining a first composite integer;
determining an encrypted second composite integer;
determining a product of the first encrypted data and the first composite integer; and
determining a sum of the first encrypted data and the encrypted second composite integer.

18. The system of claim 11, wherein the at least one memory further includes instructions, that, when executed by the at least one processor, further cause the system to:
determining, by a third system, data representing the event;
receiving, at the third system, the public-key data;
encrypting, by the third system using the public-key data, the data to determine the first encrypted data; and
sending, by the third system to the first system, the first encrypted data.

19. The system of claim 18, wherein the at least one memory further includes instructions, that, when executed by the at least one processor, further cause the system to:
determining, by the second system, the public-key data and corresponding private-key data; and
sending, by the second system to the third system, the public-key data.

20. The system of claim 19, wherein the at least one memory further includes instructions, that, when executed by the at least one processor, further cause the system to:
sending, from the first system to the second system, third encrypted data and fourth encrypted data;
decrypting, by the second system using the private-key data, the third encrypted data to determine fourth data;
decrypting, by the second system using the private-key data, the fourth encrypted data to determine fifth data;
determining, by the second system, a quotient of the fourth data and the fifth data; and
sending, from the second system to the first system, the quotient.

* * * * *

UNITED STATES PATENT AND TRADEMARK OFFICE
CERTIFICATE OF CORRECTION

Page 1 of 1

PATENT NO. : 11,038,683 B1
APPLICATION NO. : 17/156009
DATED : June 15, 2021
INVENTOR(S) : Kai Chung Cheung et al.

It is certified that error appears in the above-identified patent and that said Letters Patent is hereby corrected as shown below:

On the Title Page

(72) Inventors; Line 1 and 2: please amend:
"Kai Chung Cheung, Markham, CA (US)" to --Kai Chung Cheung, Markham (CA)--
"Jeremy Taylor, Quebec (CA)" to --Jeremy Taylor, Montreal, (CA)--

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*